United States Patent
Lee (10) Patent No.: US 11,664,903 B2
(45) Date of Patent: May 30, 2023

(54) APPARATUS AND METHOD FOR GENERATING PAM-4 OPTICAL SIGNAL

(71) Applicant: ELECTRONICS AND TELECOMMUNICATIONS RESEARCH INSTITUTE, Daejeon (KR)

(72) Inventor: Jyung Chan Lee, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 0 days.

(21) Appl. No.: 17/515,871

(22) Filed: Nov. 1, 2021

(65) Prior Publication Data

US 2022/0216920 A1 Jul. 7, 2022

(30) Foreign Application Priority Data

Jan. 5, 2021 (KR) .................. 10-2021-0000789

(51) Int. Cl.
*H04B 10/54* (2013.01)
*H04B 10/524* (2013.01)
*H04B 10/40* (2013.01)

(52) U.S. Cl.
CPC ........... *H04B 10/541* (2013.01); *H04B 10/40* (2013.01); *H04B 10/524* (2013.01)

(58) Field of Classification Search
CPC .... H04B 10/541; H04B 10/40; H04B 10/524; H04B 10/503; H04L 25/4917
USPC ........................................................ 398/186
See application file for complete search history.

(56) References Cited

U.S. PATENT DOCUMENTS

| | | | | |
|---|---|---|---|---|
| 6,445,476 B1* | 9/2002 | Kahn | .................. | H04B 10/505 398/189 |
| 6,490,069 B1* | 12/2002 | Kahn | .................. | H04B 10/505 398/186 |
| 8,452,019 B1* | 5/2013 | Fomin | ................. | H04R 29/005 381/92 |
| 8,909,067 B2 | 12/2014 | Takeguchi et al. | | |
| 2003/0011854 A1* | 1/2003 | Kahn | ................. | H04L 25/4917 398/141 |
| 2003/0180041 A1 | 9/2003 | Azadet | | |
| 2003/0180055 A1 | 9/2003 | Azadet | | |
| 2007/0134005 A1 | 6/2007 | Myong et al. | | |
| 2017/0105059 A1* | 4/2017 | Shringarpure | ........ | H03F 1/0205 |

(Continued)

FOREIGN PATENT DOCUMENTS

| | | | | |
|---|---|---|---|---|
| KR | 101819254 B1 | 1/2018 | | |
| TW | 202201933 A | * 1/2022 | ............... | H03H 7/30 |
| WO | WO-2021127299 A1 | * 6/2021 | ......... | H04B 10/5161 |

OTHER PUBLICATIONS

David Patel et al., "Silicon Photonic Segmented Modulator-Based Electro-Optic DAC for 100 GB/s PAM-4 Generation", IEEE Photonics Technology Letters, vol. 27, No. 23, Dec. 1, 2015.

*Primary Examiner* — Abbas H Alagheband
(74) *Attorney, Agent, or Firm* — Rabin & Berdo, P.C.

(57) ABSTRACT

A method and apparatus for generating a four-level pulse amplitude modulation (PAM-4) optical signal are disclosed. The method of generating a PAM-4 optical signal may include outputting a PAM-4 electrical signal, generating a PAM-4 optical signal based on the PAM-4 electrical signal, extracting feature information of the PAM-4 electrical signal from the PAM-4 electrical signal, and generating a control signal to control an operation of generating the PAM-4 electrical signal based on the feature information.

10 Claims, 12 Drawing Sheets

(56) References Cited

U.S. PATENT DOCUMENTS

| | | | |
|---|---|---|---|
| 2017/0126191 A1* | 5/2017 | Nallani | H03G 3/3084 |
| 2019/0036611 A1* | 1/2019 | Fujita | H04B 10/50575 |
| 2022/0271844 A1* | 8/2022 | Chanclou | H04B 10/07953 |

* cited by examiner

FIG. 1

Time domain

Frequency domain

FIG. 2A

Time domain

Frequency domain

FIG. 2B

Time domain

Frequency domain

FIG. 2C

Time domain

Frequency domain

FIG. 2D

Time domain

Frequency domain

APPARATUS AND METHOD FOR GENERATING PAM-4 OPTICAL SIGNAL

CROSS-REFERENCE TO RELATED APPLICATION

This application claims the benefit of Korean Patent Application No. 10-2021-0000789 filed on Jan. 5, 2021, in the Korean Intellectual Property Office, the entire disclosure of which is incorporated herein by reference for all purposes.

BACKGROUND

1. Field of the Invention

One or more example embodiments relate to a method and apparatus for generating a four-level pulse amplitude modulation (PAM-4) optical signal in an optical communication system.

2. Description of the Related Art

A technology for optical communications encounters an issue of speeding up due to widespread of long-term evolution (LTE) service and personal mobile phones with 5G service, an expansion of fiber to the home and a high-speed transmission net for various realistic multimedia services, and an emphasis on an importance of a high capacity data storage and backup devices. Four level pulse amplitude modulation (PAM-4) which may transmit two bits instead of a present non-return-to-zero (NRZ) which transmits one bit signal per one symbol was used for solving the issue.

For a universally-used PAM-4 optical signal, conventional technologies are focused on optical signal optimization.

SUMMARY

Example embodiments provide a technique to improve a performance of a four-level pulse amplitude modulation (PAM-4) optical communication signal by optimizing a PAM-4 eye symmetric ratio in an area in an inner-outer eye diagram of a PAM-4 electrical signal in PAM-4.

However, the technical aspects are not limited to the aforementioned aspects, and other technical aspects may be present.

According to an aspect, there is provided a method of generating a PAM-4 optical signal including outputting a PAM-4 electrical signal, generating a PAM-4 optical signal based on the PAM-4 electrical signal, extracting feature information of the PAM-4 electrical signal from the PAM-4 electrical signal, and generating a control signal to control an operation of generating the PAM-4 electrical signal based on the feature information.

The control signal may include a signal to control a PAM-4 eye symmetric ratio in an inner-outer eye diagram of the PAM-4 electrical signal, wherein the PAM-4 eye symmetric ratio may be, in the inner-outer eye diagram, a ratio of one area among areas excluding an inner eye from an outer eye to an area corresponding to the inner eye.

The control signal further may include a signal to tune a magnitude of the PAM-4 electrical signal.

The extracting may include extracting the feature information by performing band-pass filtering on the PAM-4 electrical signal.

The feature information may include an amplitude extracted at a peak of the PAM-4 electrical signal, an amplitude extracted at a first null, and an amplitude extracted at a second null.

The generating of the control signal may include checking a target amplitude at the peak of the PAM-4 electrical signal based on the feature information.

The generating of the control signal further may include checking an average value of target amplitudes of the first null and the second null of the PAM-4 electrical signal based on the feature information.

According to an aspect, there is provided a method of generating a four-level pulse amplitude modulation (PAM-4) optical signal including in response to a first control signal, tuning a first amplification degree in a path to process a first non-return-to-zero (NRZ) electrical signal and in a path to process a second NRZ electrical signal, in response to a second control signal, tuning a second amplification degree in a path to combine and process the first NRZ electrical signal and the second NRZ electrical signal, and generating and outputting a PAM-4 electrical signal to generate a PAM-4 optical signal based on at least one of the first amplification degree and the second amplification degree.

The first control signal may be a signal to control a PAM-4 eye symmetric ratio in an inner-outer eye diagram of the PAM-4 electrical signal, and wherein the PAM-4 eye symmetric ratio may be, in the inner-outer eye diagram, a ratio of one area among areas excluding an inner eye from an outer eye to an area corresponding to the inner eye.

The second control signal may be a signal to tune a magnitude of the PAM-4 electrical signal.

The first control signal and the second control signal may be generated based on feature information of the PAM-4 electrical signal extracted from the PAM-4 electrical signal.

The feature information may include an amplitude extracted at a peak of the PAM-4 electrical signal, an amplitude extracted at a first null, and an amplitude extracted at a second null.

According to an aspect, there is provided an apparatus for generating a four-level pulse amplitude modulation (PAM-4) optical signal, the apparatus including a signal generator configured to output a PAM-4 electrical signal, an optical modulator configured to generate a PAM-4 optical signal based on the PAM-4 electrical signal, a band-pass filter configured to extract feature information of the PAM-4 electrical signal from the PAM-4 electrical signal, and a processor configured to generate a control signal to control generating the PAM-4 electrical signal based on the feature information.

The control signal may include a signal to control a PAM-4 eye symmetric ratio in an inner-outer eye diagram of the PAM-4 electrical signal, wherein the PAM-4 eye symmetric ratio may be, in the inner-outer eye diagram, a ratio of one area among areas excluding an inner eye from an outer eye to an area corresponding to the inner eye.

The control signal further may include a signal to tune a size of the PAM-4 electrical signal.

The feature information may include an amplitude extracted at a peak of the PAM-4 electrical signal, an amplitude extracted at a first null, and an amplitude extracted at a second null.

The band-pass filter may include a first band-pass filter configured to extract an amplitude at the peak, a second band-pass filter configured to extract an amplitude at the first null, and a third band-pass filter configured to extract an amplitude at the second null.

The processor may be further configured to check a target amplitude at the peak of the PAM-4 electrical signal based on the feature information.

The processor may be further configured to check an average value of target amplitudes of the first null and the second null of the PAM-4 electrical signal based on the feature information.

According to an aspect, there is provided an optical signal generator including input ports configured to receive a first control signal and a second control signal, a signal generator configured to generate and output a four-level pulse amplitude modulation (PAM-4) electrical signal to generate a PAM-4 optical signal by tuning a first amplification degree in a path to process a first non-return-to-zero (NRZ) electrical signal and in a path to process a second NRZ electrical signal in response to the first control signal or tuning a second amplification degree in a path to combine and process the first NRZ electrical signal and the second NRZ electrical signal, and an output port configured to output the PAM-4 electrical signal.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

The following detailed structural or functional description is provided as an example only and various alterations and modifications may be made to the examples. Here, the examples are not construed as limited to the disclosure and should be understood to include all changes, equivalents, and replacements within the idea and the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, example embodiments will be described in detail with reference to the accompanying drawings. When describing the example embodiments with reference to the accompanying drawings, like reference numerals refer to like components and a repeated description related thereto will be omitted.

Figure 1:
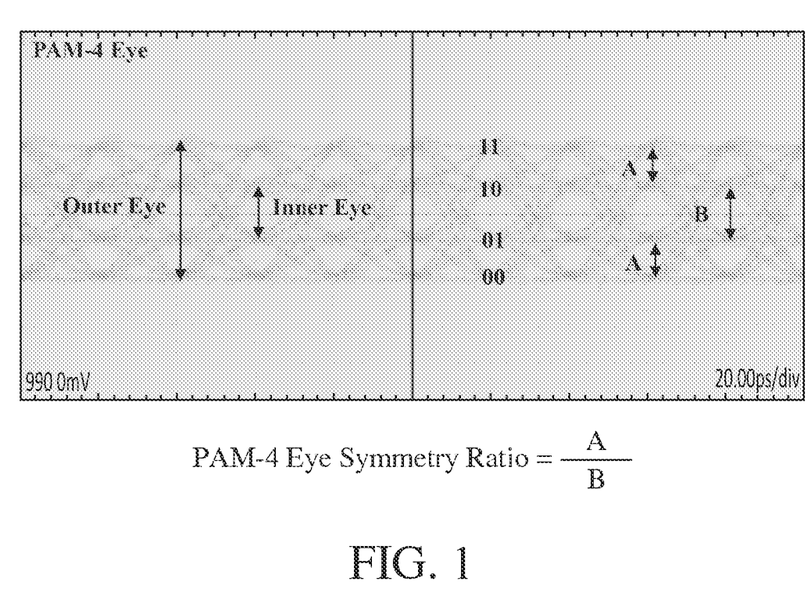
FIG. 1 is a diagram illustrating a four-level pulse amplitude modulation (PAM-4) eye symmetric ratio in an inner-outer eye diagram of a PAM-4 electrical signal according to an example embodiment.
Figure 2A:
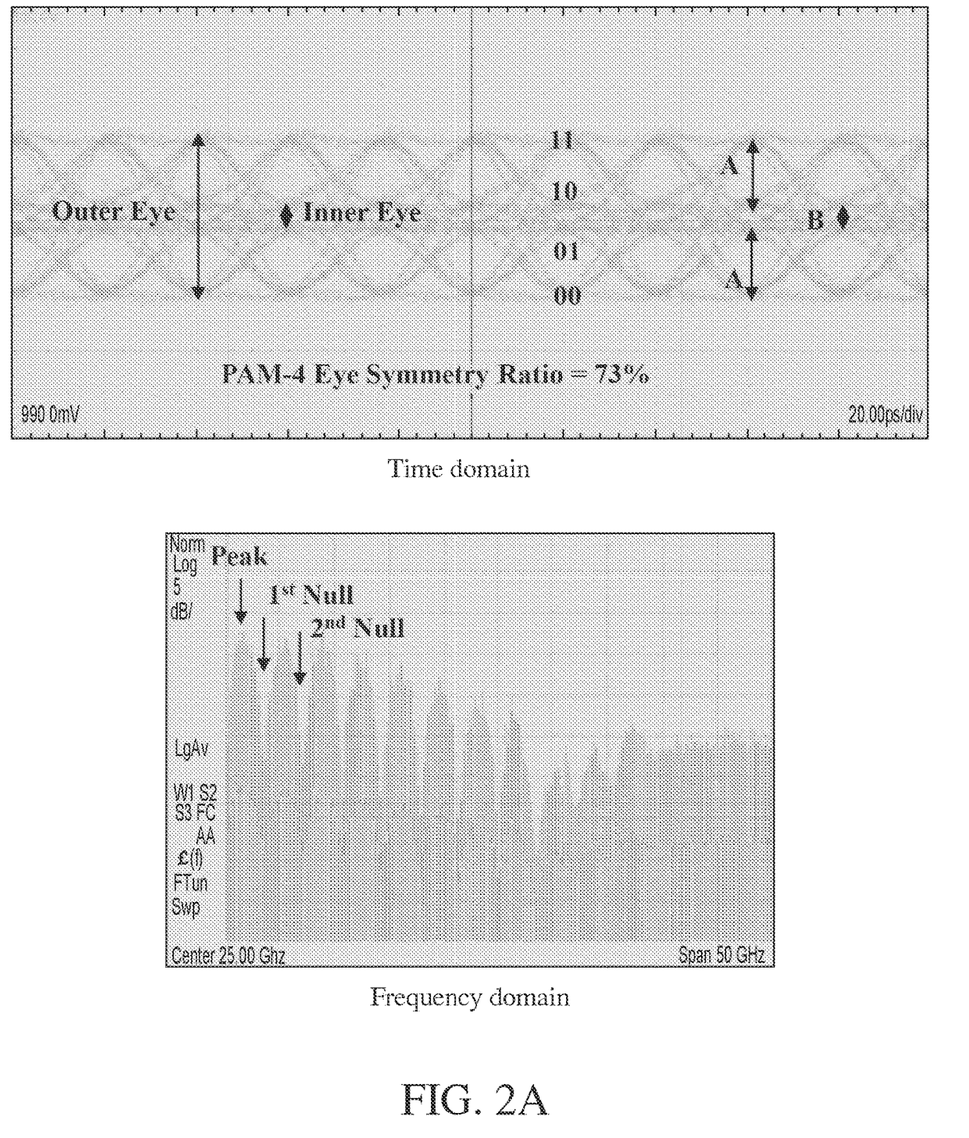
FIGS. 2A to 2E are diagrams illustrating characteristics of time domains and frequency domains based on PAM-4 eye symmetric ratios of PAM-4 electrical signals.
Figure 2B:
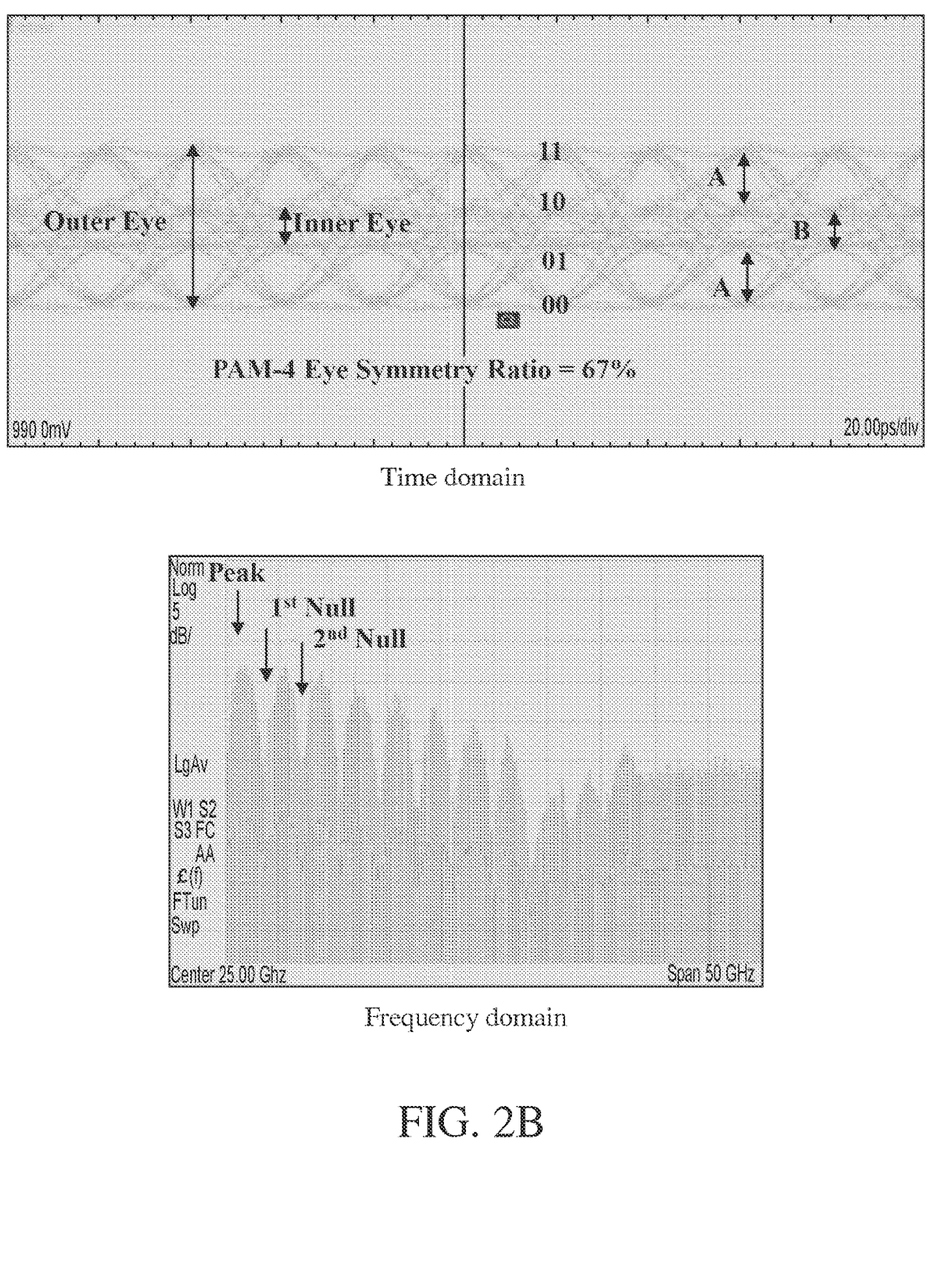
Figure 2C:
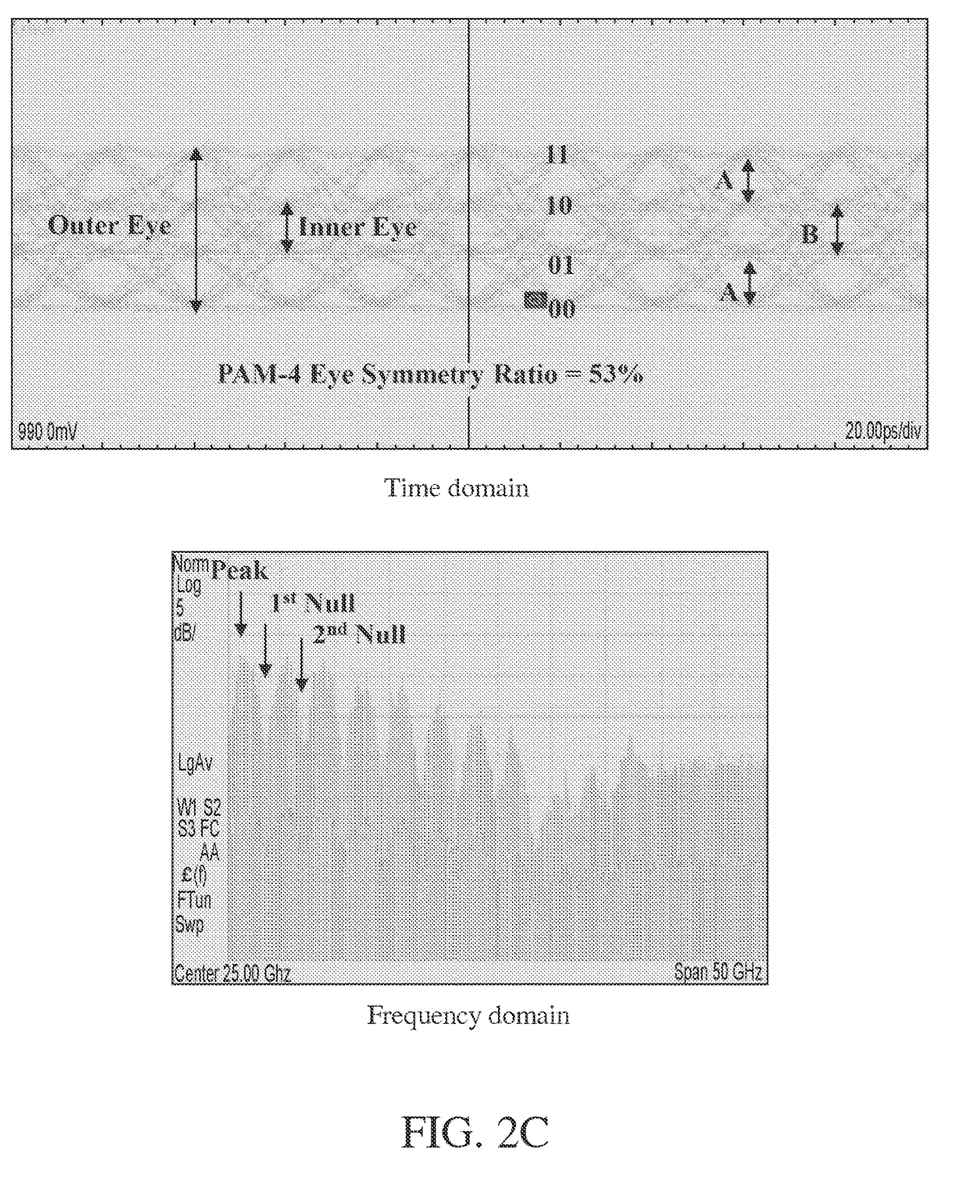
Figure 2D:
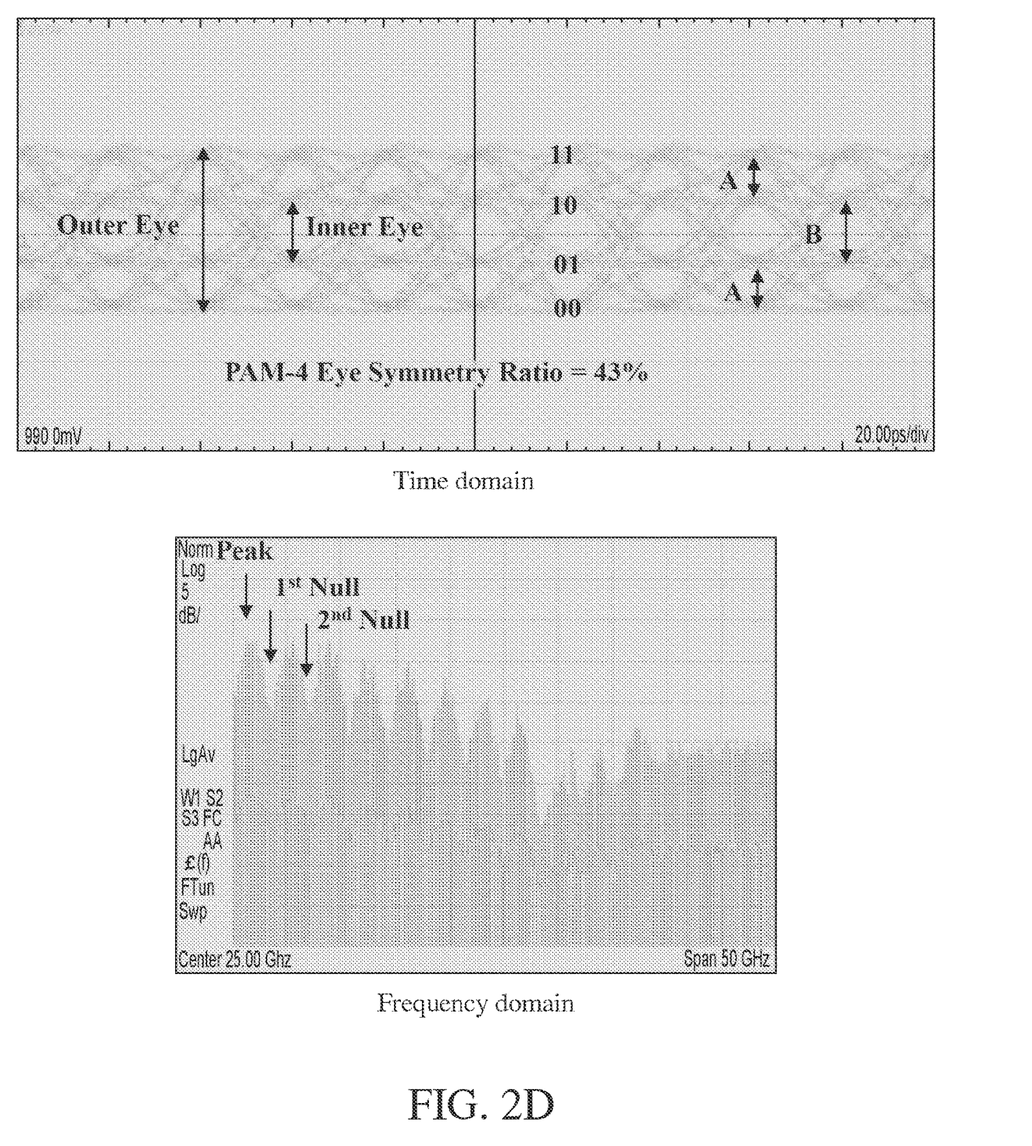
Figure 2E:
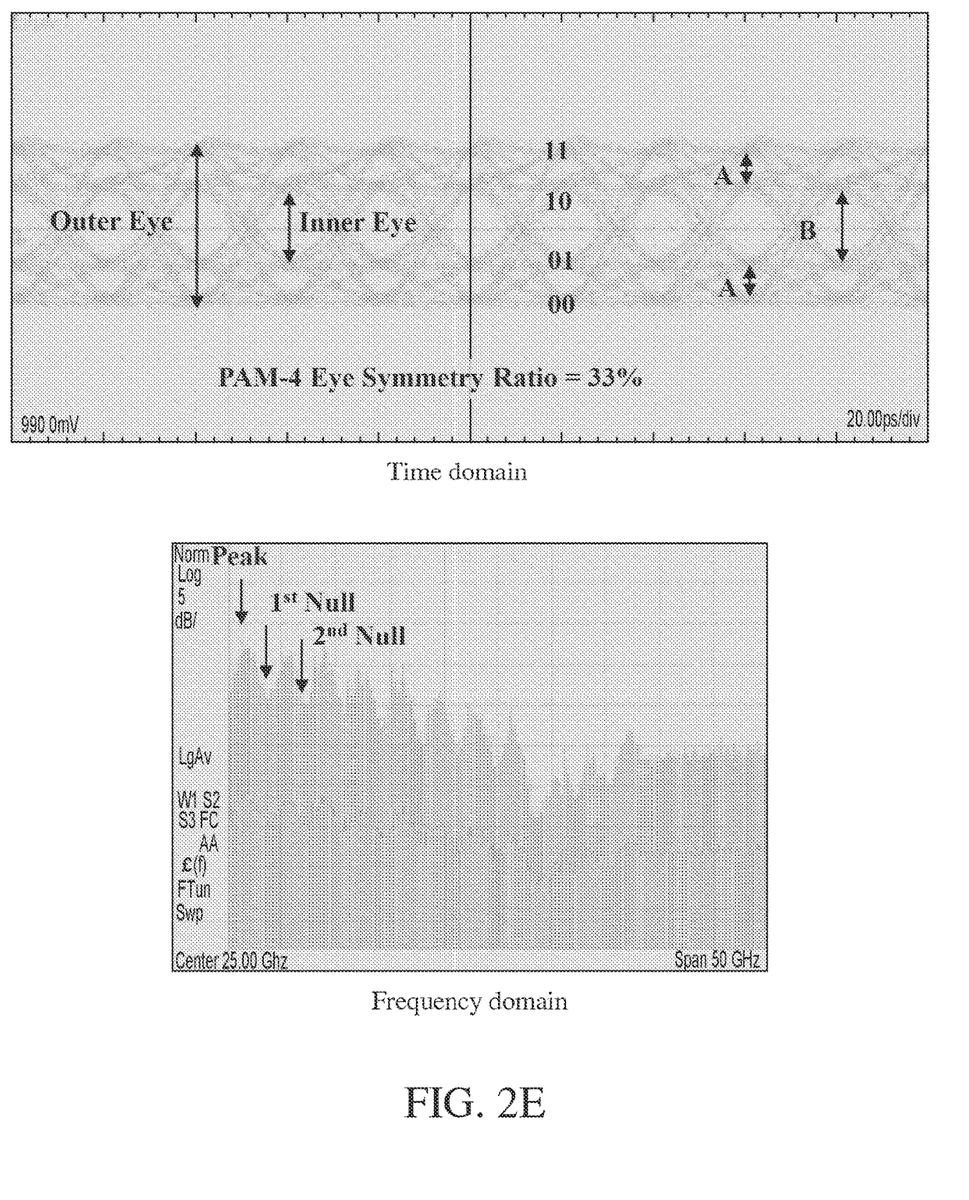
Figure 3:
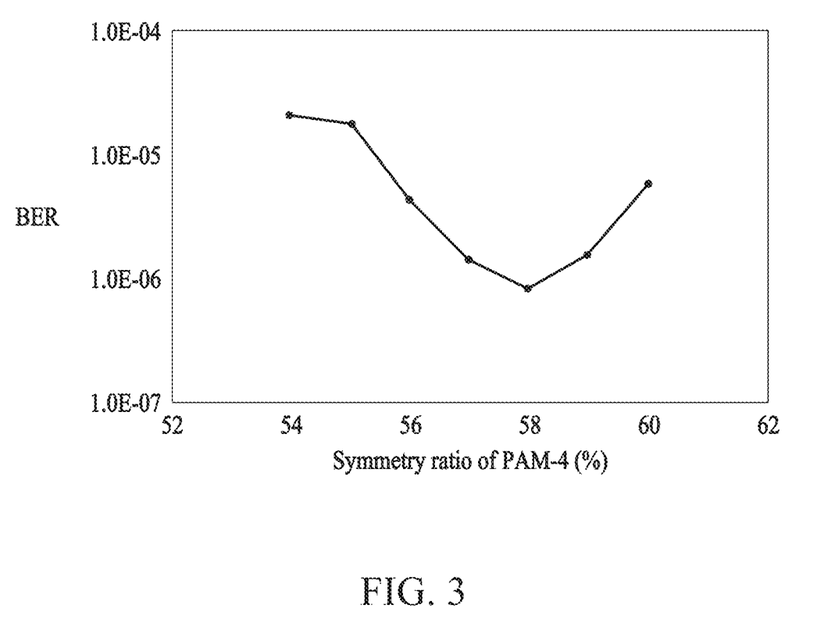
FIG. 3 is a diagram illustrating a characteristic of a bit error rate based on a PAM-4 eye symmetric ratio of a PAM-4 electrical signal.

FIG. 1 is a diagram illustrating a four-level pulse amplitude modulation (PAM-4) eye symmetric ratio in an inner-outer eye diagram of a PAM-4 electrical signal according to an example embodiment. FIGS. 2A to 2E are diagrams illustrating characteristics of time domains and frequency domains based on PAM-4 eye symmetric ratios of PAM-4 electrical signals. FIG. 3 is a diagram illustrating a characteristic of a bit error rate based on a PAM-4 eye symmetric ratio of a PAM-4 electrical signal.

Referring to FIGS. 1 to 3, generating a PAM-4 optical signal may include generating a PAM-4 electrical signal. A PAM-electrical signal may be used for the generating of the PAM-4 optical signal. For areas of an inner-outer eye diagram of a PAM-4 electrical signal shown in FIG. 1, Area A may refer to areas (for example, an upper area and a lower area) excluding an inner eye from an outer eye and Area B may refer to the inner eye. A ratio of Area A to Area B may be defined as a PAM-4 eye symmetric ratio in the inner-outer eye diagram of the PAM-4 electrical signal.

FIGS. 2A to 2E show characteristics of time domains and frequency domains according to changes in a PAM-4 eye symmetric ratio to 73%, 67%, 53%, 43%, and 33% respectively. FIG. 3 shows a characteristic of a bit error rate when a PAM-4 eye symmetric ratio varies to 73%, 67%, 53%, 43%, and 33% in a PAM-4 electrical signal (for example, a 100 Gb/s PAM-4 electrical signal). In general, it may be predicted that the best symmetry ratio would be 50%. However, as shown in FIG. 3, a bit error rate may be minimized at the PAM-4 eye symmetric ratio of about 58%, not about 50% as predicted, indicating that it is an optimal performance position. This may be due to noise characteristics and frequency dependent characteristics of components (for example, a laser source, an optical modulator, a signal generator, and an amplifier of FIG. 4) configured to generate a PAM-4 electrical signal. It may be necessary to tune a symmetry ratio in the inner-outer eye diagram of the PAM-4 electrical signal considering noise characteristics and frequency dependent characteristics of components configured to generate the PAM-4 electrical signal.

Example embodiments may optimize a performance of a PAM-4 optical signal by optimizing a bit error rate inherently occurring in generating a PAM-4 electrical signal by optimizing a PAM-4 eye symmetric ratio in an inner-outer eye diagram of a PAM-4 electrical signal.

Figure 4:
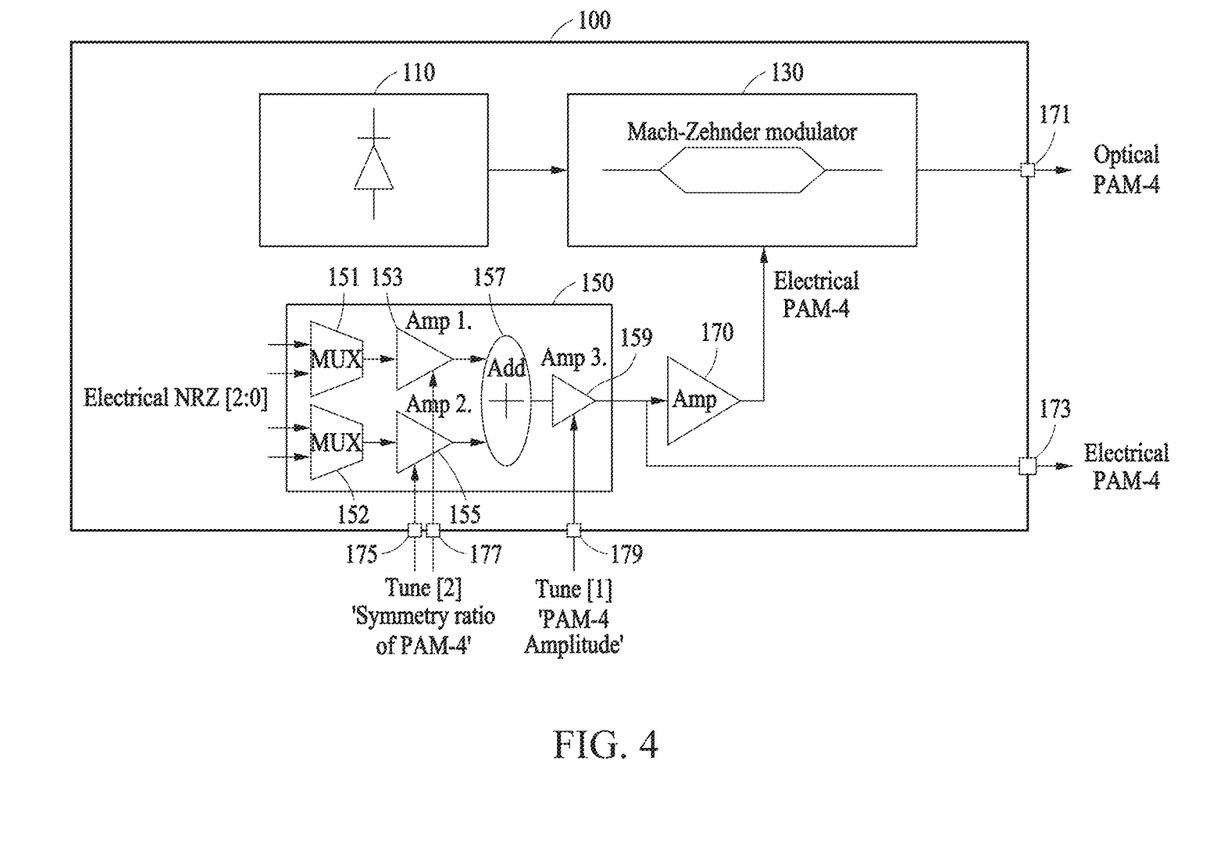
FIG. 4 is a block diagram illustrating an example of an optical signal generator according to an example embodiment.

FIG. 4 is a block diagram illustrating an optical signal generator according to an example embodiment.

An optical signal generator 100 may be a PAM-4 optical signal generator. The optical signal generator 100 may include a laser source 110, an optical modulator 130, a signal generator 150 and an amplifier 170.

The laser source 110 may output light to the optical modulator 130. The laser source 110 may be a continuous wave source.

The optical modulator 130 may be an optical PAM-4 modulator and may generate a PAM-4 optical signal (for example, Optical PAM-4) by performing photoelectric transformation. The optical modulator 130 may include a Mach-Zehnder modulator. The optical modulator 130 may receive a PAM-4 electrical signal (for example, Electrical PAM-4) output from the signal generator 150. The PAM-4 electrical signal may be amplified by the amplifier 170. The optical modulator 130 may generate a PAM-4 optical signal by performing photoelectric transformation on the PAM-4 electrical signal based on light output from the laser source 110. The PAM-4 optical signal may include data.

The signal generator 150 may be a non-return-to-zero (NRZ) to PAM-4 multiplexer and may generate a PAM-4 electrical signal. The signal generator 150 may generate a PAM-4 electrical signal based on a plurality of NRZ electrical signals (for example, Electrical NRZ [2:0]) and may output to the optical modulator 130. The signal generator 150 may include a first multiplexer 151, a second multiplexer 152, a first amplifier 153, a second amplifier 155, an adder 157, and a third amplifier 159. The signal generator 150 may receive four NRZ electrical signals (for example, first to fourth NRZ electrical signals) to output one PAM-4 electrical signal (for example, Electrical PAM-4). Among the four NRZ electrical signals, two NRZ electrical signals may be input to a first path and the remaining two NRZ electrical signals may be input to a second path. The first multiplexer 151 and the first amplifier 153 may configure the first path and the second multiplexer 152 and the second amplifier 155 may be included in the second path.

The first multiplexer 151 may generate and output a first predetermined-bit-delayed NRZ electrical signal based on the first NRZ electrical signal and the second NRZ electrical signal among the four NRZ electrical signals. The first amplifier 153 may amplify and output the first predetermined-bit-delayed NRZ electrical signal output from the first multiplexer 151.

The second multiplexer 152 may generate and output a second predetermined-bit-delayed NRZ electrical signal based on the third NRZ electrical signal and the fourth NRZ electrical signal among the four NRZ electrical signals. The second amplifier 155 may amplify and output the second predetermined-bit-delayed NRZ electrical signal output from the second multiplexer 152.

The first predetermined-bit-delayed NRZ electrical signal and the second predetermined-bit-delayed NRZ electrical signal may be consecutive signals. The first predetermined-bit and the second predetermined-bit may be identical bits or different bits.

The adder 157 may combine a signal (for example, an amplified signal of the first predetermined-bit-delayed NRZ electrical signal by the first amplifier 153) output from the first amplifier 153 with a signal (for example, an amplified signal of the second predetermined-bit-delayed NRZ electrical signal by the second amplifier 155) output from the second amplifier 155. The third amplifier 159 may generate a PAM-4 electrical signal by amplifying a combined signal combined by the adder 157 and may output the PAM-4 electrical signal to the optical modulator 130.

The optical signal generator 100 may include an output port 171 configured to output a PAM-4 optical signal as well as an output port 173 configured to output a PAM-4 electrical signal and three input ports 175, 177, and 179. The input ports 175, 177, and 179 may be intended for inputs of control signals (for example, Tune [1] 'PAM-4 Amplitude', Tune [2] 'Symmetry Ratio of PAM-4') for the signal generator 150 to perform optimizing and tuning. The output port 173 may be intended to output a PAM-4 electrical signal to generate the control signals (for example, Tune [1] 'PAM-4 Amplitude', Tune [2] 'Symmetry Ratio of PAM-4'). In response to the control signals (for example, Tune [1] 'PAM-4 Amplitude', Tune [2] 'Symmetry Ratio of PAM-4'), the signal generator may perform optimizing a PAM-4 eye symmetric ratio in an inner-outer eye diagram of the PAM-4 electrical signal and tuning a magnitude (for example, an amplitude) of the PAM-4 electrical signal.

The first input port 175 and the second input port 177 may be intended for inputs of control signals (for example, Tune [2] 'Symmetry Ratio of PAM-4') to control (for example, tune) amplification degrees of the amplifiers 153 and 155 in respective paths to process the first predetermined-bit-delayed electrical signal and the second predetermined-bit-delayed electrical signal. The control signals (for example, Tune [2] 'Symmetry Ratio of PAM-4') may be signals to control a PAM-4 eye symmetric ratio in the inner-outer eye diagram of the PAM-4 electrical signal. The signal generator 150 may tune (for example, optimize) the PAM-4 eye symmetric ratio by tuning amplification degrees of the amplifiers 153 and 155 in response to a control signal (for example, Tune [2] 'Symmetry Ratio of PAM-4').

The third input port 179 may be intended for an input of a control signal (for example, Tune [1] 'PAM-4 Amplitude') to control (for example, tune) a final amplification degree (for example, an amplification degree) in a path (for example, the third amplifier 159 to amplify a signal combined by the adder 157) to combine and process the first predetermined-bit-delayed NRZ electrical signal and the second predetermined-bit-delayed NRZ electrical signal. The control signal (for example, Tune [1] 'PAM-4 Amplitude') may be a signal to tune a magnitude (for example, an amplitude) of a PAM-4 electrical signal. In response to the control signal (for example, Tune [1] 'PAM-4 Amplitude'), the signal generator 150 may tune a magnitude of a PAM-4 electrical signal by tuning an amplification degree of the third amplifier 159. By tuning the magnitude of the PAM-4 electrical signal, a magnitude of a PAM-4 optical signal generated and output from the optical modulator 130 may also be tuned.

Figure 5:
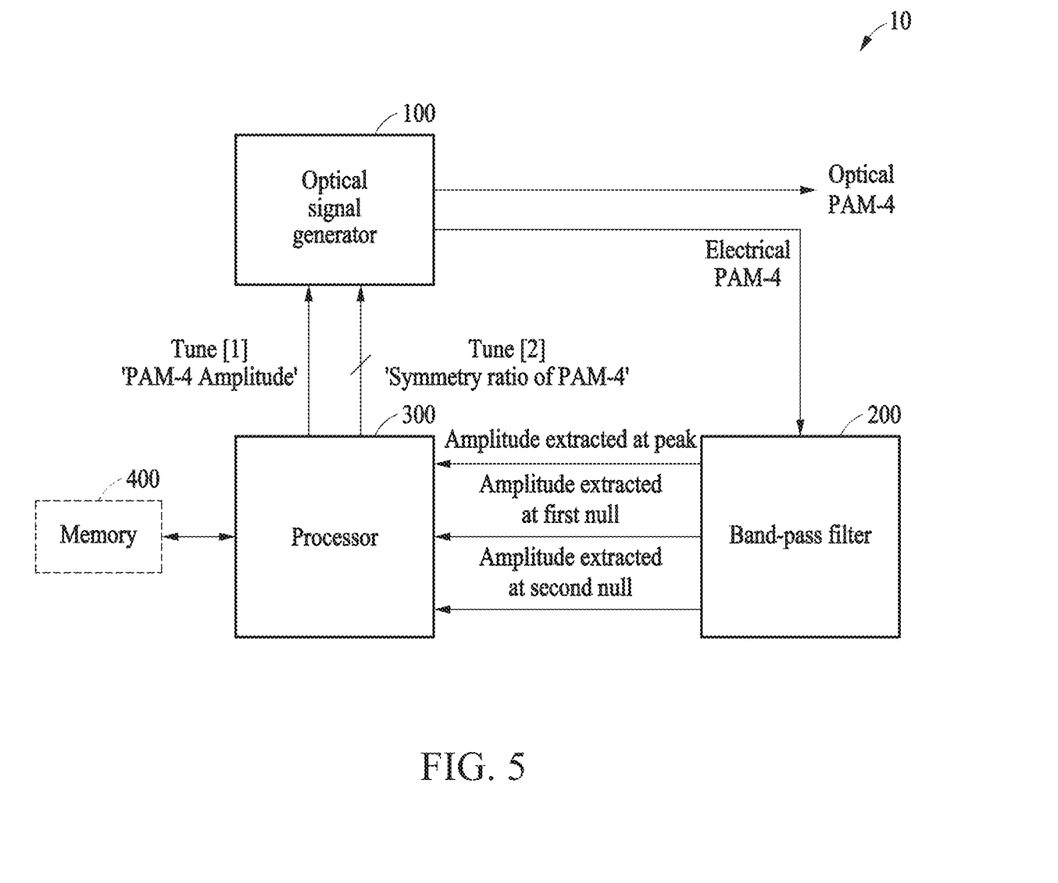
FIG. 5 illustrates an example of an optical signal generating apparatus according to an example embodiment.
Figure 6:
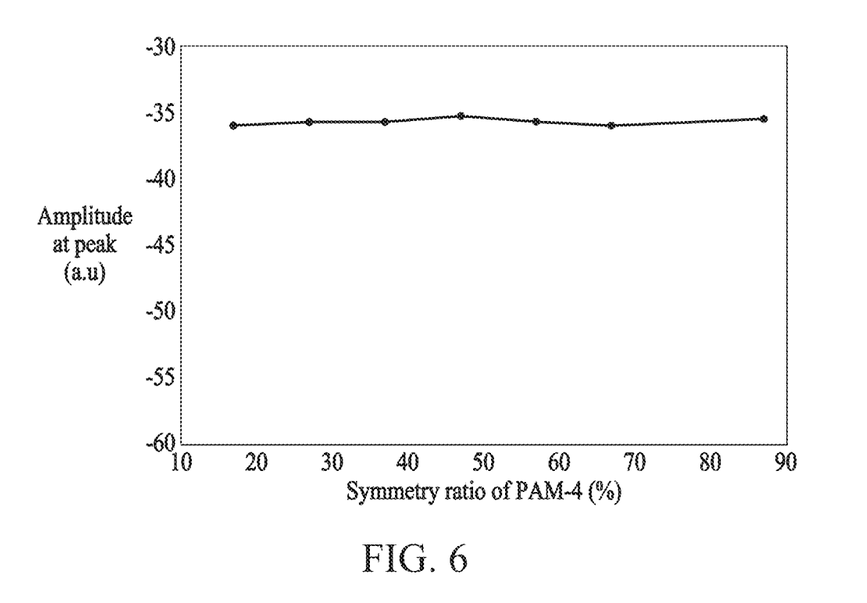
FIGS. 6, 7A, 7B and 7C illustrate examples of feature information of PAM-4 electrical signals extracted by a band-pass filter.
Figure 7A:
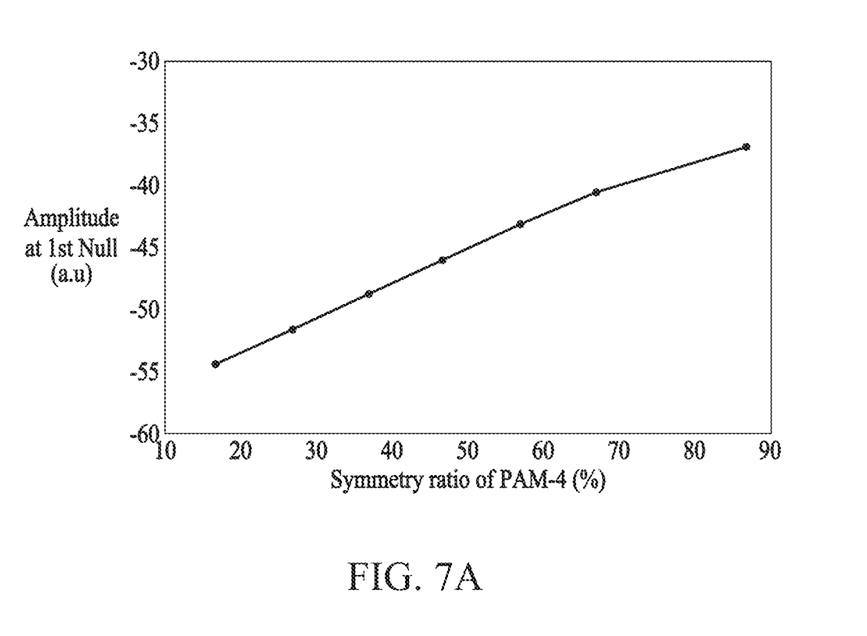
Figure 7B:
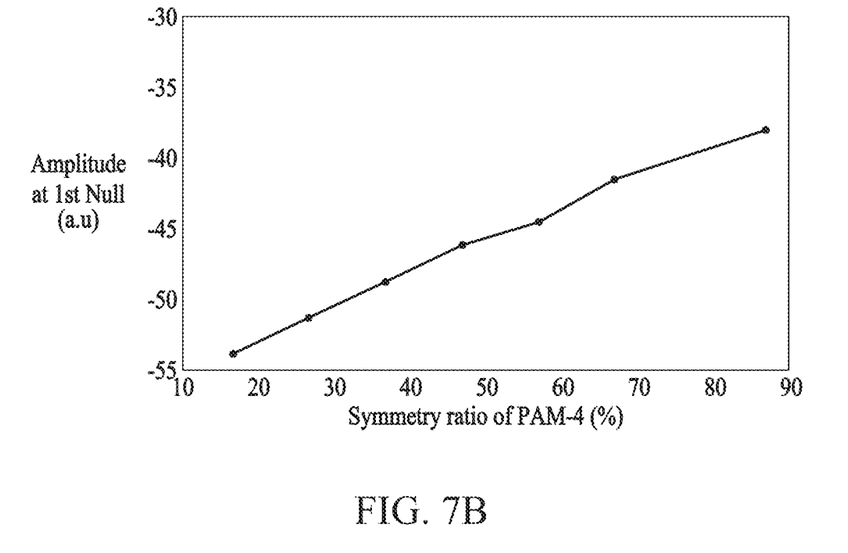
Figure 7C:
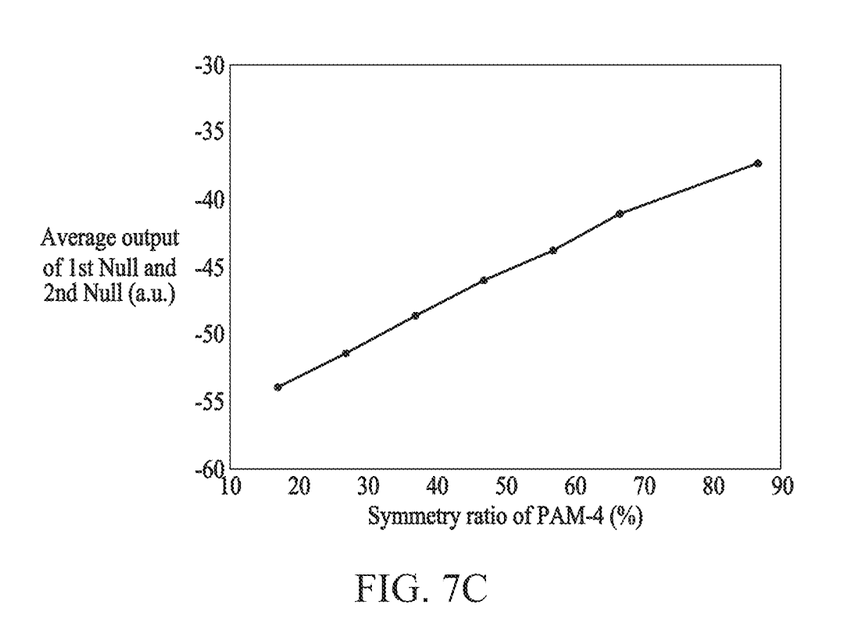

FIG. 5 illustrates an example of an optical signal generating apparatus according to an example embodiment. FIGS. 6 to 7C illustrate examples of feature information of PAM-4 electrical signals extracted by a band-pass filter.

The optical signal generating apparatus 10 may include the optical signal generator 100, a band-pass filter 200, and a processor 300. The optical signal generating apparatus 10 may further include a memory 400.

The optical signal generator 100 may generate a PAM-4 optical signal by performing photoelectric transformation on a PAM-4 electrical signal. The optical signal generator 100 may output the PAM-4 optical signal and the PAM-4 electrical signal.

The band-pass filter 200 may receive the PAM-4 electrical signal output from the optical signal generator 100 and may perform a filtering (for example, a band-pass filtering) on the PAM-4 electrical signal. The band-pass filter 200 may extract feature information of the PAM-4 electrical signal from the PAM-4 electrical signal. The band-pass filter 200 may output feature information of the PAM-4 electrical signal to the processor 300. The feature information may include an amplitude extracted at a peak of a PAM-4 electrical signal, an amplitude extracted at a first null (for example, a first null of a PAM-4 electrical signal), and an amplitude extracted at a second null (for example, a second null of a PAM-4 electrical signal). The band-pass filter 200 may include a first band-pass filter to extract an amplitude at a peak of a PAM-4 electrical signal, a second band-pass filter to extract an amplitude at the first null and a third band-pass filter to extract an amplitude at the second null.

As a result of extracting by the band-pass filter 200, FIG. 6 shows an example of feature information at peaks of a PAM-4 electrical signal and FIGS. 7A and 7B show feature information at the first null and at the second null of the PAM-4 electrical signal, which may be based on a change in an inner-outer eye diagram symmetry of the PAM-4 electrical signal. The amplitude extracted at the first null and the amplitude extracted at the second null by the band-pass filter 200 may be processed by the processor 300. An average value of the two amplitudes may be used. FIG. 7C shows an example according to a change in an inner-outer eye diagram symmetry of a PAM-4 electrical signal.

The processor 300 may generate control signals (for example, Tune [1] 'PAM-4 Amplitude', Tune [2] 'Symmetry Ratio of PAM-4') based on feature information of a PAM-4 electrical signal extracted by the band-pass filter 200.

The processor 300 may generate a control signal (for example, Tune [1] 'PAM-4 Amplitude') to tune a magnitude (for example, an amplitude) of a PAM-4 electrical signal based on an amplitude extracted from a peak of the PAM-4 electrical signal. The processor 300 may check if a target amplitude at a peak of the PAM-4 electrical signal is identical to an amplitude extracted by the band-pass filter 200, and if not, may generate a control signal (for example, Tune [1] 'PAM-4 Amplitude')

The processor 300 may generate a control signal (for example, Tune [2] 'Symmetry Ratio of PAM-4') to control a PAM-4 eye symmetric ratio in an inner-outer eye diagram of a PAM-4 electrical signal based on an amplitude extracted at the first null and an amplitude extracted at the second null of the PAM-4 electrical signal. The processor 300 may check if an average value of target amplitudes of the first null and the second null of a PAM-4 electrical signal and an average value (for example, an average value of an amplitude extracted at the first null and an amplitude extracted at the second null by the band-pass filter 200) of amplitudes extracted by the band-pass filter 200 are identical, and if not, may generate a control signal (for example, Tune [2] 'Symmetry Ratio of PAM-4').

The memory 400 may store executable instructions (or programs) by the processor 300. For example, the instructions may include instructions to perform an operation of the processor 300 and/or an operation of each element of the processor 300.

The processor 300 may process data stored in the memory 400. The processor 300 may execute a computer-readable code (for example, software) stored in the memory 400 and instructions triggered by the processor 300.

The processor 300 may be a data processing device implemented by hardware including a circuit having a physical structure to perform desired operations. For example, the desired operations may include code or instructions included in a program.

For example, the hardware-implemented data processing device may include a microprocessor, a central processing unit (CPU), a processor core, a multi-core processor, a multiprocessor, an application-specific integrated circuit (ASIC), and a field-programmable gate array (FPGA).

Figure 8:
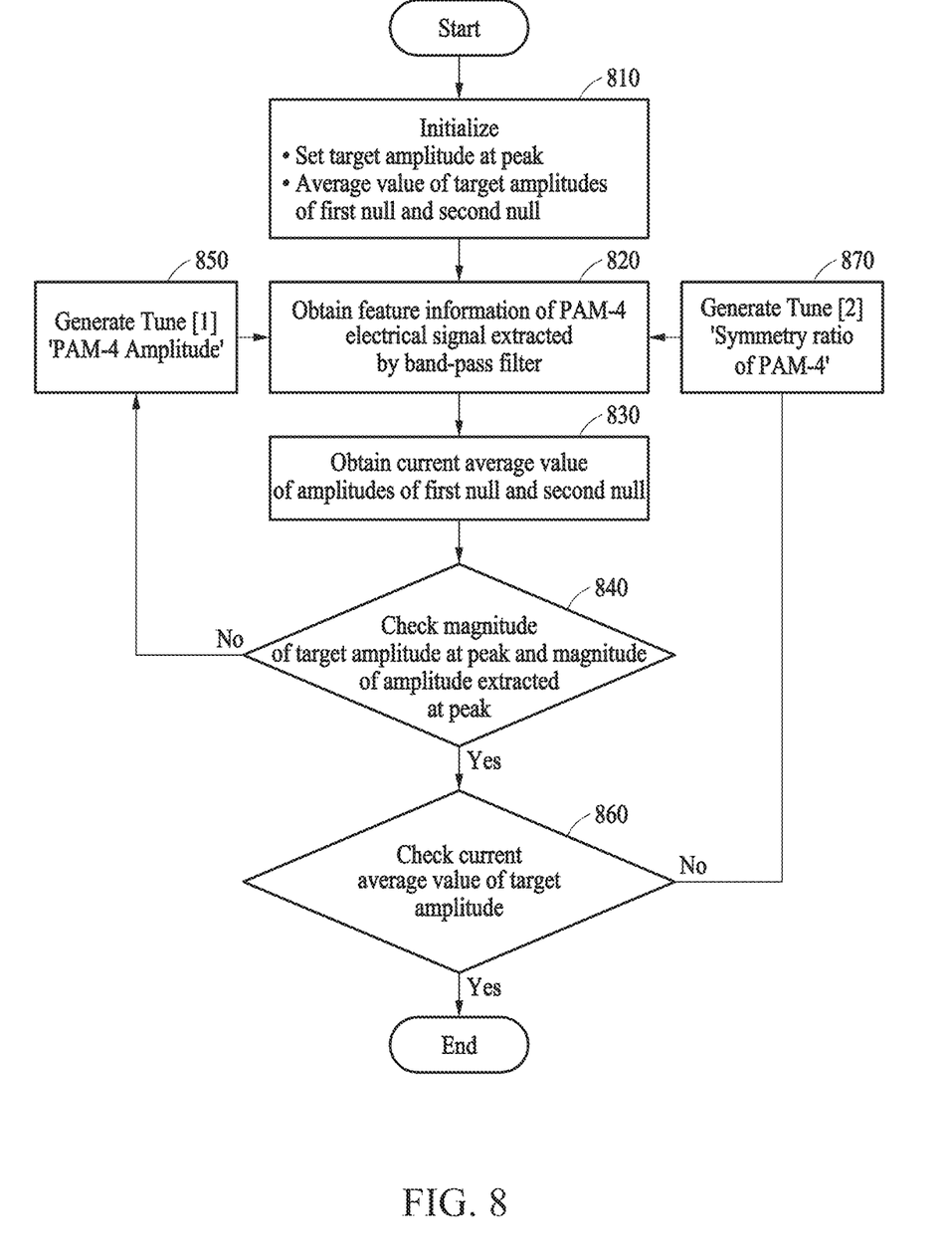
FIG. 8 is a flowchart illustrating an operation of generating control signals by a processor.

FIG. 8 is a flowchart illustrating an operation of generating control signals of a processor.

In operation 810, the processor 300 may perform an operation of initializing. The processor 300 may set a target amplitude at a peak of a PAM-4 electrical signal and may set an average value of target amplitudes of the first null and the second null of the PAM-4 electrical signal. The average value of the target amplitudes of the first null and the second null may be an average value of a target amplitude at the first null and a target amplitude at the second null.

In operation 820, the processor 300 may obtain feature information of the PAM-4 electrical signal extracted by the band-pass filter 200. The feature information may be extracted from the PAM-4 electrical signal by the band-pass filter 200 and may include an amplitude extracted at the peak, an amplitude extracted at the first null and an amplitude extracted at the second null.

In operation 830, the processor 300 may obtain a current average value of amplitudes of the first null and the second null using the amplitude extracted at the first null and the amplitude extracted at the second null. The current average value of the amplitudes of the first null and the second null may be an average value of the amplitude extracted at the first null and the amplitude extracted at the second null.

In operation 840, the processor 300 may check a magnitude of the target amplitude at the peak and a magnitude of the amplitude extracted at the peak.

In operation 850, the processor 300 may generate a control signal (for example, Tune [1] 'PAM-4 Amplitude') when the magnitude of the target amplitude at the peak is different from the magnitude of the amplitude extracted at the peak. The processor 300 may output the control signal (for example, Tune [1] 'PAM-4 Amplitude') to the third input port 179 of the optical signal generator 100.

In operation 860, the processor 300 may check the current average value of the amplitudes of the first null and the second null and the average value of the target amplitudes of the first null and the second null.

In operation 870, the processor 300 may generate a control signal (for example, Tune [2] 'Symmetry Ratio of PAM-4') when the current average value of the amplitudes of the first null and the second null is different from the average value of the target amplitudes of the first null and the second null. The processor 300 may output the control signal (for example, Tune [2] 'Symmetry Ratio of PAM-4') to the first input port 175 and the second input port 177 of the optical signal generator 100.

The optical signal generator 100 may generate a PAM-4 electrical signal and a PAM-4 optical signal when receiving at least one of the control signals (for example, Tune [1]

'PAM-4 Amplitude', Tune [2] 'Symmetry Ratio of PAM-4'), and the PAM-4 electrical signal generated by the optical signal generator 100 may be used for operation 820 to 870.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The examples described herein may be implemented using hardware components, software components and/or combinations thereof. A processing device may be implemented using one or more general-purpose or special-purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or pseudo equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A method of generating a four-level pulse amplitude modulation (PAM-4) optical signal, the method comprising:
   outputting a PAM-4 electrical signal;
   generating a PAM-4 optical signal based on the PAM-4 electrical signal;
   extracting feature information of the PAM-4 electrical signal from the PAM-4 electrical signal; and
   generating a control signal for controlling an operation when generating the PAM-4 electrical signal based on the feature information;
   wherein the generating of the control signal comprises checking a target amplitude at a peak of the PAM-4 electrical signal based on the feature information; and
   wherein the generating of the control signal further comprises checking an average value of target amplitudes of a first null and a second null of the PAM-4 electrical signal based on the feature information.

2. The method of claim 1, wherein the control signal comprises a signal to control a PAM-4 eye symmetric ratio in an inner-outer eye diagram of the PAM-4 electrical signal,
   wherein the PAM-4 eye symmetric ratio is, in the inner-outer eye diagram, a ratio of an outer area of the inner-outer eye diagram to an inner area of the inner-outer eye diagram.

3. The method of claim 2, wherein the control signal further comprises a signal to tune a magnitude of the PAM-4 electrical signal.

4. The method of claim 1, wherein the extracting comprises extracting the feature information by performing band-pass filtering on the PAM-4 electrical signal.

5. The method of claim 1, wherein the feature information comprises an amplitude extracted at the peak of the PAM-4 electrical signal, an amplitude extracted at the first null, and an amplitude extracted at the second null.

6. An apparatus for generating a four-level pulse amplitude modulation (PAM-4) optical signal, the apparatus comprising:
   a signal generator configured to output a PAM-4 electrical signal;
   an optical modulator configured to generate a PAM-4 optical signal based on the PAM-4 electrical signal;
   a band-pass filter configured to extract feature information of the PAM-4 electrical signal from the PAM-4 electrical signal; and a processor configured to generate a control signal for controlling when generating the PAM-4 electrical signal based on the feature information;

wherein the feature information comprises an amplitude extracted at a peak of the PAM-4 electrical signal, an amplitude extracted at a first null, and an amplitude extracted at a second null; and wherein the band-pass filter comprises:

a first band-pass filter configured to extract the amplitude at the peak;

a second band-pass filter configured to extract the amplitude at the first null; and a third band-pass filter configured to extract the amplitude at the second null.

7. The apparatus of claim 6, wherein the control signal comprises a signal to control a PAM-4 eye symmetric ratio in an inner-outer eye diagram of the PAM-4 electrical signal, wherein the PAM-4 eye symmetric ratio is, in the inner-outer eye diagram, a ratio of an outer area of the inner-outer eye diagram to an inner area of the inner-outer eye diagram.

8. The apparatus of claim 7, wherein the control signal further comprises a signal to tune a size of the PAM-4 electrical signal.

9. The apparatus of claim 6, wherein the processor is further configured to check a target amplitude at the peak of the PAM-4 electrical signal based on the feature information.

10. An apparatus for generating a four-level pulse amplitude modulation (PAM-4) optical signal, the apparatus comprising:

a signal generator configured to output a PAM-4 electrical signal;

an optical modulator configured to generate a PAM-4 optical signal based on the PAM-4 electrical signal;

a band-pass filter configured to extract feature information of the PAM-4 electrical signal from the PAM-4 electrical signal; and a processor configured to generate a control signal for controlling when generating the PAM-4 electrical signal based on the feature information;

wherein the processor is further configured to check a target amplitude at a peak of the PAM-4 electrical signal based on the feature information;

wherein the processor is further configured to check an average value of target amplitudes of a first null and a second null of the PAM-4 electrical signal based on the feature information.

* * * * *